United States Patent
Okamoto et al.

(10) Patent No.: US 11,212,400 B2
(45) Date of Patent: Dec. 28, 2021

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventors: Takuya Okamoto, Kanagawa (JP); Toshiyuki Komoda, Kanagawa (JP); Shinsuke Nakazawa, Kanagawa (JP); Yoshihito Suezawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/157,540

(22) Filed: Oct. 11, 2018

(65) Prior Publication Data
US 2019/0124216 A1 Apr. 25, 2019

(30) Foreign Application Priority Data
Oct. 25, 2017 (JP) .............................. JP2017-206449

(51) Int. Cl.
*H04N 1/00* (2006.01)
(52) U.S. Cl.
CPC ............................. *H04N 1/00424* (2013.01)
(58) Field of Classification Search
CPC combination set(s) only.
See application file for complete search history.

(56) References Cited

U.S. PATENT DOCUMENTS

| | | | | |
|---|---|---|---|---|
| 2006/0044612 A1* | 3/2006 | Kayama | ................ | G06F 3/1264 358/1.15 |
| 2006/0075339 A1* | 4/2006 | Tomita | .................... | G06F 3/125 715/255 |
| 2009/0091770 A1* | 4/2009 | Kano | ................. | H04N 1/00132 358/1.1 |
| 2009/0323096 A1* | 12/2009 | Oshima | .................. | G06Q 10/06 358/1.13 |
| 2013/0290902 A1* | 10/2013 | Martin | .................... | D06F 34/28 715/823 |
| 2014/0009479 A1* | 1/2014 | Ishida | ....................... | G06T 1/60 345/531 |

(Continued)

FOREIGN PATENT DOCUMENTS

JP  H09-223003 A  8/1997
JP  H10-171655 A  6/1998

(Continued)

OTHER PUBLICATIONS

Jun. 29, 2021 Office Action issued in Japanese Patent Application No. 2017-206449.

(Continued)

*Primary Examiner* — Helen Zong
(74) *Attorney, Agent, or Firm* — Oliff PLC

(57) ABSTRACT

An information processing apparatus includes a display and a controller. The display displays a document and displays a list of multiple graphic symbols respectively indicating multiple jobs with respect to the document. In a case where any one of the multiple graphic symbols is selected, the controller displays the selected graphic symbol in a distinguishable mode from another non-selected graphic symbol.

12 Claims, 7 Drawing Sheets

(56) References Cited

U.S. PATENT DOCUMENTS

| | | | |
|---|---|---|---|
| 2014/0268232 A1* | 9/2014 | Uchikawa | H04N 1/00912 358/1.15 |
| 2014/0293349 A1* | 10/2014 | Murai | H04N 1/00442 358/1.15 |
| 2016/0117941 A1* | 4/2016 | Mitchell | G06Q 10/101 434/362 |
| 2016/0277607 A1* | 9/2016 | Tanaka | H04N 1/00474 |
| 2017/0255430 A1* | 9/2017 | Lahey | G06F 3/1262 |
| 2018/0074769 A1* | 3/2018 | Hirose | H04N 1/00222 |

FOREIGN PATENT DOCUMENTS

| | | |
|---|---|---|
| JP | 2003-196671 A | 7/2003 |
| JP | 2004-246510 A | 9/2004 |
| JP | 2007-093297 A | 4/2007 |
| JP | 2009-276957 A | 11/2009 |

OTHER PUBLICATIONS

DocuWorks 8, Solution Mall 2017, published by Fuji Xerox, pp. 6-7, 2017.

\* cited by examiner

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-206449 filed Oct. 25, 2017.

BACKGROUND

Technical Field

The present invention relates to information processing apparatuses and non-transitory computer readable media.

SUMMARY

According to an aspect of the invention, there provided an information processing apparatus including a display and a controller. The display displays a document and displays a list of multiple graphic symbols respectively indicating multiple jobs with respect to the document. In a case where any one of the multiple graphic symbols is selected, the controller displays the selected graphic symbol in a distinguishable mode from another non-selected graphic symbol.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described below with reference to the drawings.

First Exemplary Embodiment

Figure 1:
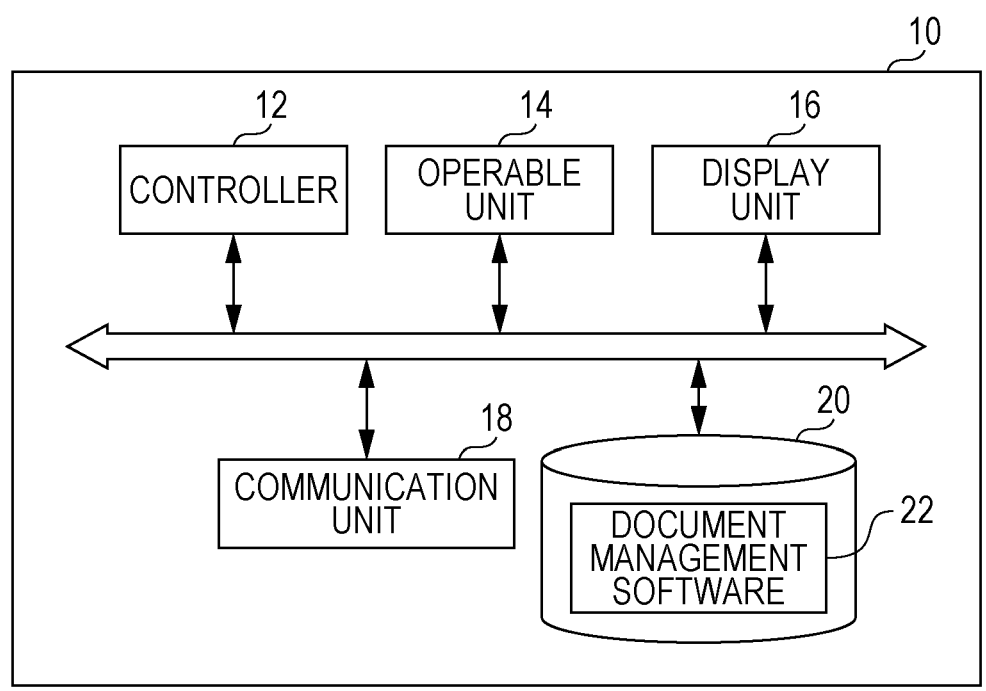
FIG. 1 is a structural block diagram according to an exemplary embodiment.

FIG. 1 is a structural block diagram of an information processing apparatus 10 according to a first exemplary embodiment. Specifically, the information processing apparatus 10 is, for example, a personal computer, a smartphone, or a tablet terminal.

The information processing apparatus 10 includes a controller 12, an operable unit 14, a display unit 16, a communication unit 18, and a storage unit 20.

The controller 12 includes one or more central processing units (CPUs), a read-only memory (ROM), and a random access memory (RAM). Each CPU loads a program onto the RAM from the ROM or the storage unit 20 and executes the program.

The operable unit 14 is, for example, a keyboard, a mouse, and/or a touchscreen and receives a desired operation performed by a user.

The display unit 16 is, for example, a liquid crystal display or an organic electroluminescence (EL) display and displays various types of information in accordance with a command from the controller 12.

The communication unit 18 exchanges data with an external server via a communication line. The communication line is, for example, the Internet or a local area network (LAN).

The storage unit 20 is a storage device, such as a flash memory, a hard disk drive (HDD), or a solid state drive (SSD). The storage unit 20 may be a storage device, such as a memory card, detachable from the information processing apparatus 10. The storage unit 20 stores therein document management software 22. The document management software 22 is, for example, DocuWorks (registered trademark). The document management software 22 may be stored in the storage unit 20 via a storage medium, such as a digital versatile disc read-only memory (DVD-ROM), or may be stored in the storage unit 20 by being downloaded from an external server via the communication unit 18.

The one or more CPUs of the controller 12 read the document management software 22 from the storage unit 20 and execute the document management software 22 so as to execute various types of document management processes. Specifically, the controller 12 displays an electronic desk on the display unit 16, displays documents (i.e., paper and electronic documents) side-by-side on the electronic disk, and allows browsing and editing to be performed on the arranged documents. When the user selects a desired document from the documents displayed on the electronic desk, the controller 12 displays the selected document on the display unit 16 by using a display module (viewer), which is a module included in the document management software 22. The viewer includes various types of tools that allow for browsing and editing in units of pages.

Figure 2:
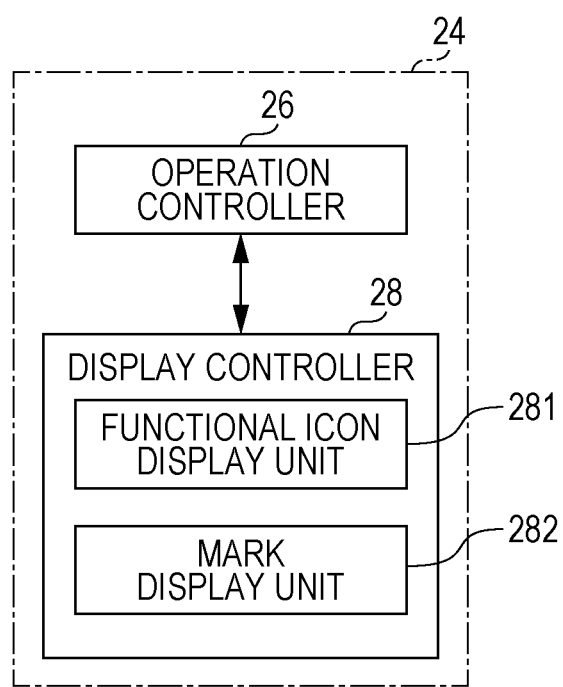
FIG. 2 is a functional block diagram of a display module (viewer) according to the exemplary embodiment.

FIG. 2 is a functional block diagram of a display module (viewer) 24. The viewer 24 includes an operation controller 26 and a display controller 28. Although these functional blocks are realized by the one or more CPUs of the controller 12 executing a processing program, one or more of the functional blocks may be realized in accordance with hardware processing instead of software processing executed by a program. Hardware processing may be performed by using a circuit, such as an application specific integrated circuit (ASIC) or a field-programmable gate array (FPGA).

The operation controller 26 functions as a controller and detects an operation performed on the operable unit 14 by the user. The operation controller 26 outputs a command according to the contents of the operation performed by the user to the display controller 28.

The display controller 28 functions as a display and a controller and controls a user interface in the display unit 16. In addition to the basic function of displaying a document on the display unit 16 in accordance with a command from the operation controller 26, the display controller 28 includes a functional icon display unit 281 and a mark display unit 282.

The functional icon display unit 281 displays a work tool bar at a predetermined position of a screen, specifically, at a lower section of the viewer in which the document is displayed, in accordance with a command from the operation controller 26. In the work tool bar, an example of graphic symbols (icons) indicating jobs (functions or commands) are arranged in the form of a list, and the user appropriately select whether the work tool bar is to be displayed or not displayed, and also select which of the graphic symbols (icons) is to be displayed. The graphic symbols will be referred to as icons hereinafter.

The mark display unit 282 adds a predetermined mark to an icon in the work tool bar in accordance with a command from the operation controller 26. This mark indicates which of the jobs the user has executed. The mark may be in an arbitrary form that allows a specific icon to be distinguishable from other icons.

Figure 3A:
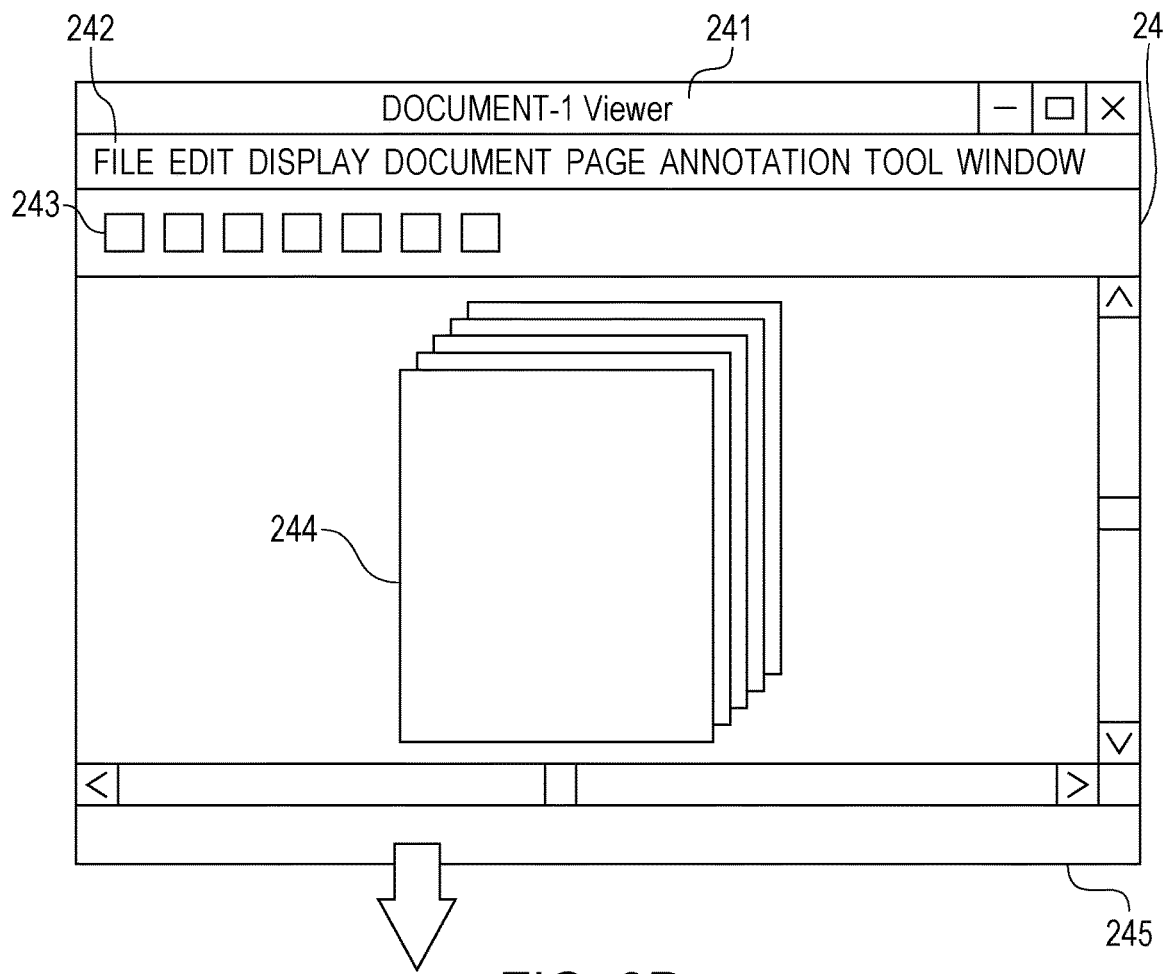
FIGS. 3A and 3B illustrate display examples of a viewer and a work tool bar according to the exemplary embodiment.

FIG. 3A illustrates an example of a document displayed on the display unit 16 by the viewer 24. The viewer 24 functions as a single window. A document name (document-1) 241 of the document being displayed is displayed at a predetermined position of the viewer 24, such as at an upper section, and an operation menu 242 is displayed below the document name 241. The operation menu 242 includes, for example, a file tab, an edit tab, a display tab, a document tab, a page tab, an annotation tab, a tool tab, and a window tab. Icons 243 used for performing various types of operations are displayed below the operation menu 242. A display area for displaying documents is disposed below the icons 243, and a document 244 is displayed in, for example, a layered fashion in this display area.

The document 244 is displayed in a layered fashion because, for example, the number of pages of the document 244 constituted of multiple pages may be readily ascertained intuitively, a desired page may be readily designated, and a specific page may be readily recognized in a case where an annotation is added to the page.

The viewer 24 may display the document 244 in successive pages instead of in layers, and the user may appropriately select which of the modes is to be used for displaying the document 244.

The viewer 24 is activated for each document. By simultaneously activating multiple viewers 24, that is, multiple windows, multiple documents may be simultaneously displayed.

The functional icon display unit 281 displays a work tool bar 245 at the bottommost section of the viewer 24. The functional icon display unit 281 displays icons in accordance with a command transmitted from the operation controller 26 in accordance with an operation performed by the user.

Figure 3B:
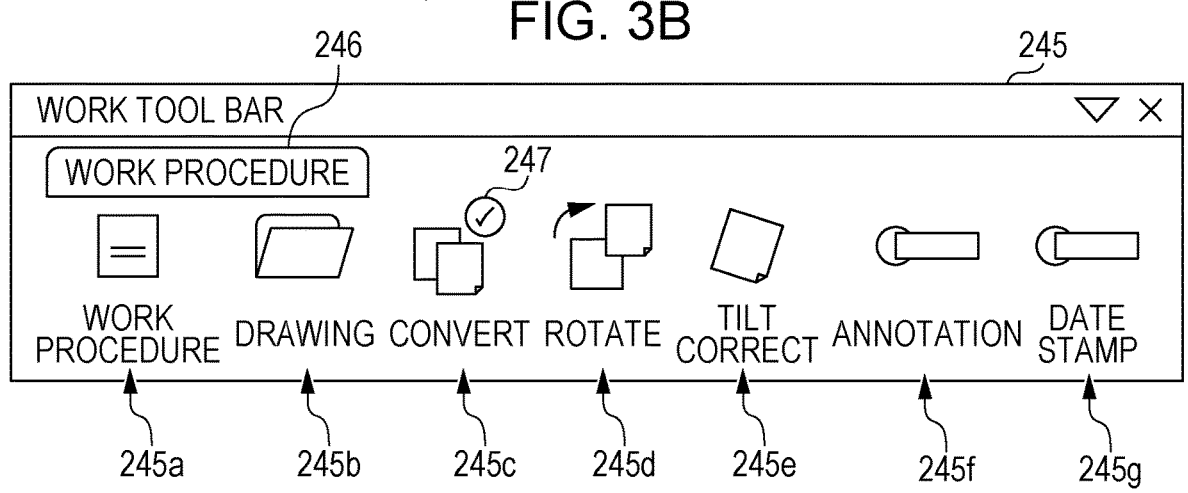

FIG. 3B is an enlarged view of the work tool bar 245.

The work tool bar 245 displays an example of icons indicating jobs (functions or commands) selected by the user for each tab 246. In FIG. 3B, a work procedure icon 245a, a drawing icon 245b, a convert icon 245c, a rotate icon 245d, a tilt correct icon 245e, an annotation icon 245f, and a date stamp icon 245g are displayed in a "work procedure" tab 246.

The work procedure icon 245a is an icon indicating a job involving creating a work procedure. The drawing icon 245b is an icon indicating a job involving selecting a drawing from a folder. The convert icon 245c is an icon indicating a job involving converting a drawing into a predetermined format, such as a DocuWorks (registered trademark) format. The rotate icon 245a is an icon indicating a job involving rotating a document. The tilt correct icon 245e is an icon indicating a job involving correcting a tilt of a document. The annotation icon 245f is an icon indicating a job involving adding an annotation. The date stamp icon 245g is an icon indicating a job involving stamping a date on a document.

The icons 245a to 245g may be appropriately selected by the user and be added to the work tool bar 245. For example, when the user moves a cursor to the work tool bar 245 and right-clicks a mouse, the display controller 28 displays an "add icon" menu in accordance with a command from the operation controller 26. A job (function or command) to be added may be selected from this menu, and an icon indicating the job may be selected.

Each of the icons 245a to 245g is an icon indicating a job (function or command). When the user presses one of these icons, the job (function or command) associated with the icon is executed. For example, when the user presses the convert icon 245c, the document is converted into a predetermined format. When the user presses the rotate icon 245d, a menu for designating the rotational amount is displayed, and the user may input a desired rotational amount based on which the document is rotated. When the user presses the annotation icon 245f, a menu for adding an annotation to the document is displayed. When the user presses the date stamp icon 245g, a date is stamped on the document.

For example, if the user desires to convert the document into a predetermined format, the user may press the convert icon 245c. However, after the document is converted into the predetermined format by pressing the convert icon 245c, if the work is interrupted due to a certain reason and is to be subsequently resumed on the document, it is unclear how much of the work has been executed if there is no mark added to the work tool bar 245. This implies that the progress of the work is dependent on user's memory, or that the user may have to record on a memo sheet how much of the work has been executed, thus involving a complicated process.

In this exemplary embodiment, in a case where the user presses any one of the icons 245a to 245g in the work tool bar 245, a predetermined mark is added to the pressed icon in addition to executing the job (function or command) of the pressed icon. Specifically, when the user presses an icon, the mark display unit 282 of the display controller 28 adds a mark to the icon in accordance with a command from the operation controller 26. The operation controller 26 transmits a command to the mark display unit 282 and also registers information about the mark-added icon in a registry.

FIG. 3B illustrates a state where a check mark 247 has been added as an example of such a mark to the convert icon 245c. Even when the work is to be resumed after an interruption, the user may visually recognize this check mark 247 so as to visually recognize that the work has been executed up to the document conversion process and to visually recognize that the job following the conversion is to be subsequently executed.

The following two modes may be used by the mark display unit 282 for displaying a check mark or marks 247.

Mode 1: Add a check mark 247 only to an icon last pressed by the user.

Mode 2: Add check marks 247 to all icons pressed by the user.

Figure 4:
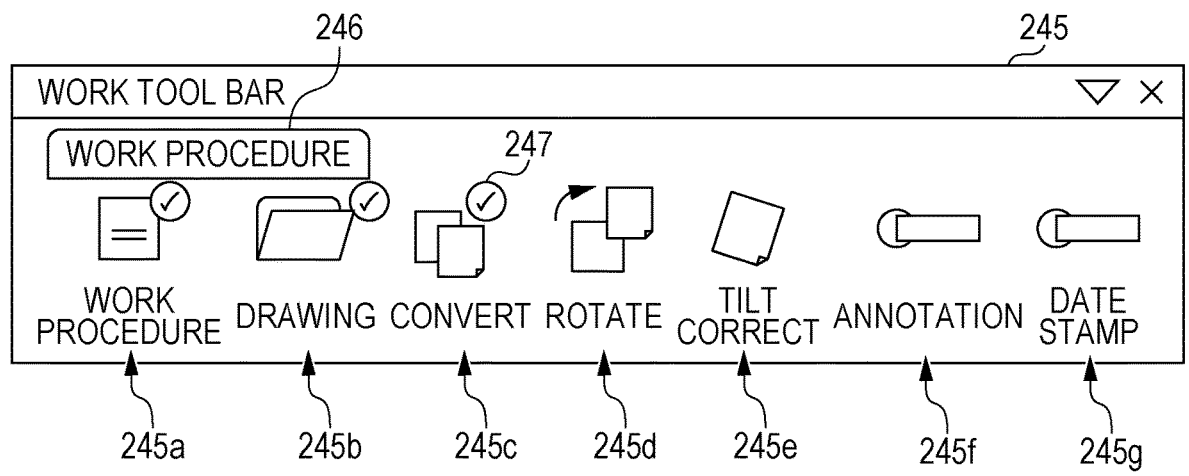
FIG. 4 illustrates a display example of marks according to the exemplary embodiment.

FIG. 4 illustrates the display in the case of the mode 2. In a case where the user presses the work procedure icon 245a, the drawing icon 245b, and the convert icon 245c, check marks 247 are added to all of these icons. By adding check marks 247 to all of the aforementioned icons, if the icons 245a to 245g displayed in the work tool bar 245 are sequentially arranged from left to right in accordance with the work procedure, the user may visually recognize how much of the work has been executed in the sequential work procedure and may also visually recognize the last-executed job.

However, the icons 245a to 245g displayed in the work tool bar 245 are not necessarily always arranged in accordance with the work procedure. Furthermore, it is desirable in terms of user-friendliness that the icons be movable, and the icons may sometimes be not arranged in accordance with the work procedure when the icons are moved. Therefore, in such a case, it is desirable that the mode 1 be used, that is, a check mark 247 be added only to an icon last pressed by the user, as shown in FIG. 3B The user may select which of the modes 1 and 2 is to be used for displaying a check mark or marks 247.

The flow of processing in the mode 1 in the viewer 24 is as follows.

The document 244 is displayed within the window in accordance with an operation performed by the user, and the work tool bar 245 is displayed at the lower section of the window.

A list of icons indicating jobs (functions or commands) is displayed in the work tool bar 245 in accordance with an operation performed by the user. The displayed icons may be arranged in the order according to the work procedure or may be arranged independently of the work procedure.

In a case where an icon is pressed in accordance with an operation performed by the user, the job (function or command) associated with the icon is executed, and a check mark 247 is added to the icon.

Information about the icon to which the check mark 247 is added is registered in the registry.

In a case where another icon is pressed in accordance with an operation performed by the user, the already-added check mark 247 is deleted, the job associated with the last-pressed icon is executed, and a check mark 247 is added to the last-pressed icon.

The information about the icon from which the check mark 247 is deleted is deleted from the registry, and information about the icon to which the check mark 247 is newly added is registered in the registry.

The work tool bar 245 may also be configured to display icons in each of multiple tabs.

Figure 5:
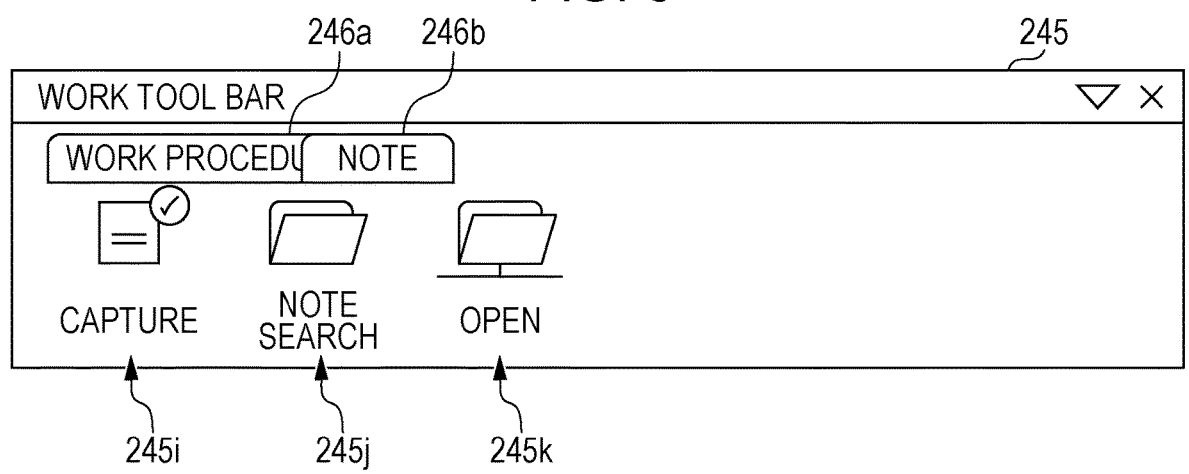
FIG. 5 illustrates a display example of a mark in another tab according to the exemplary embodiment.

FIG. 5 illustrates an example where icons are displayed in each tab. In addition to a work procedure tab 246a, a note tab 246b is added as a tab. A rectangular tab may be created for each document. In the note tab 246b, a capture icon 245i, a note search 245j, and an open icon 245k are displayed in a single row. The capture icon 245i last pressed by the user has a check mark 247 added thereto.

The icons 245a to 245g and the icons 245i to 245k are independent of each other between the respective tabs, and the check marks 247 are also independent of each other between the tabs. The term "independent" in this case means that addition or deletion of a check mark 247 in a certain tab has no effect on a check mark 247 in another tab.

Figure 6:
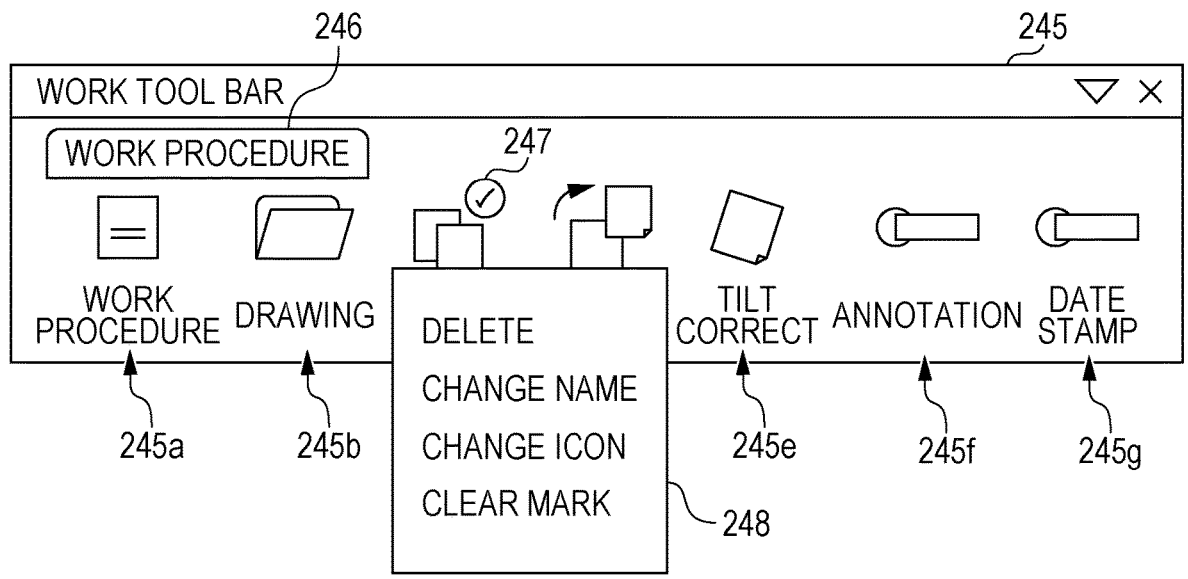
FIG. 6 illustrates a first mark deleting process according to the exemplary embodiment.

FIG. 6 illustrates an example where a check mark 247 is deleted in the work procedure tab 246a. For example, when the user right-clicks a check mark 247, the mark display unit 282 displays a menu 248 in accordance with a command from the operation controller 26. In the menu 248, for example, a delete item, a change name item, a change icon item, and a clear mark item are displayed. When the user selects the clear mark item, the mark display unit 282 sets the check mark 247 in the original non-displayed state, that is, in a state where the check mark 247 is not displayed, in accordance with a command from the operation controller 26. When the check mark 247 is cleared, the operation controller 26 deletes, from the registry, the registered information about the icon to which that check mark is added.

Figure 7:
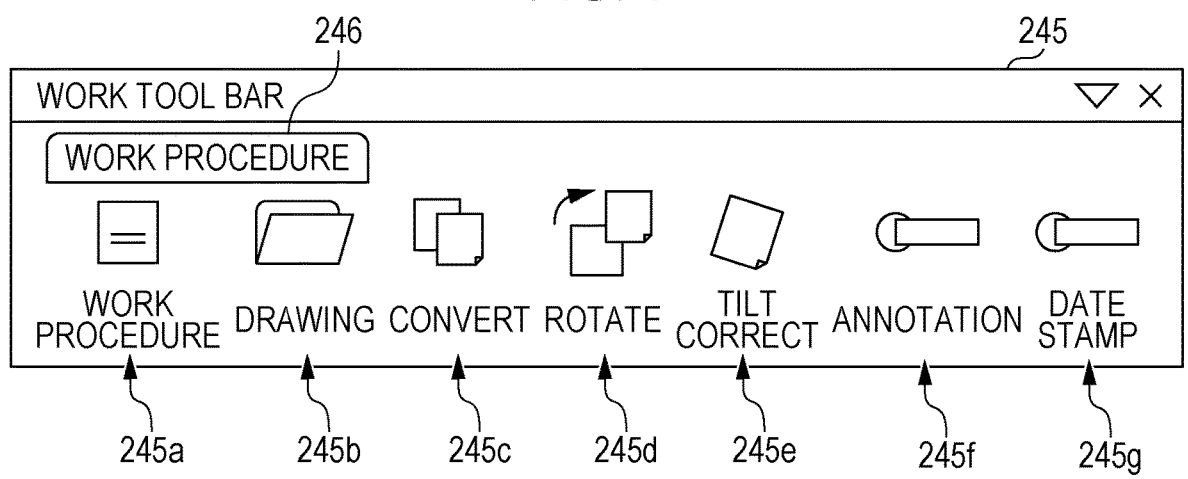
FIG. 7 illustrates a second mark deleting process according to the exemplary embodiment.

FIG. 7 illustrates a state where the check mark 247 previously added to the convert icon 245c has been deleted therefrom. In this case, the check mark 247 added to the capture icon 245i in the note tab 246b is still continuously displayed.

Figure 8:
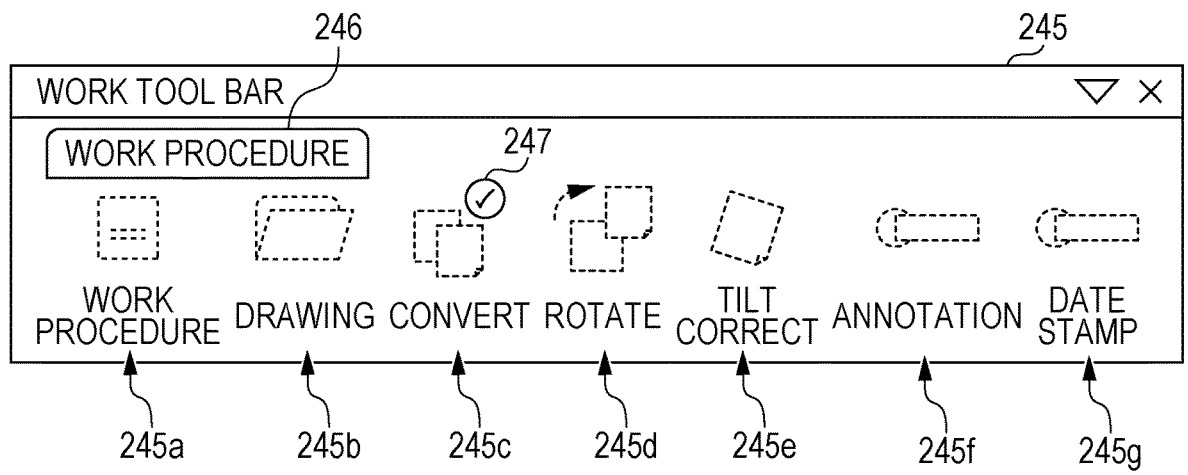
FIG. 8 illustrates a gray-out display example according to the exemplary embodiment.

FIG. 8 illustrates a case where the icons 245a to 245g in the work tool bar 245 are displayed in a gray-out fashion. The term "gray-out" refers to a state where an item is displayed in gray to indicate that the item is not eligible as an operable target. For the sake of convenience, a gray-out icon is indicated by a dashed line in FIG. 8. Even when the icons 245a to 245g are displayed in a gray-out fashion in this manner, the mark display unit 282 displays the convert icon 245c with a check mark 247 added thereto. Even if an icon is displayed in a gray-out fashion and is not an operable target, the user may visually recognize the check mark 247 so as to confirm how much of the work has been executed.

Figure 9:
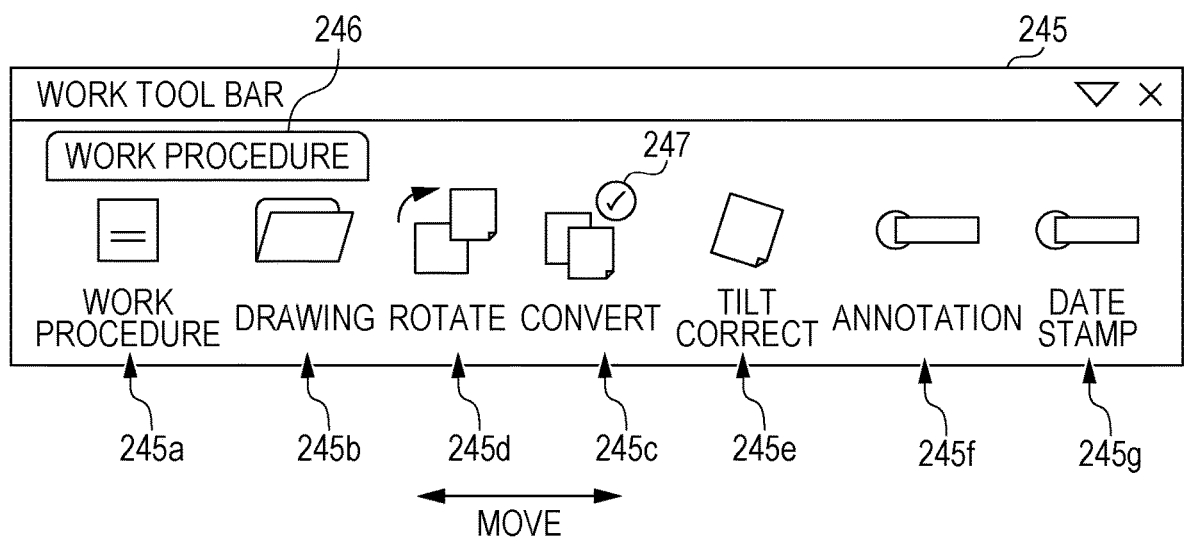
FIG. 9 illustrates an icon moving process according to the exemplary embodiment.

FIG. 9 illustrates a case where the convert icon 245c in the work tool bar 245 is moved. The user may move the convert icon 245c to a freely-chosen position by dragging and dropping the convert icon 245c. In this case, the mark display unit 282 displays a check mark 247 in association with the convert icon 245c.

Figure 10:
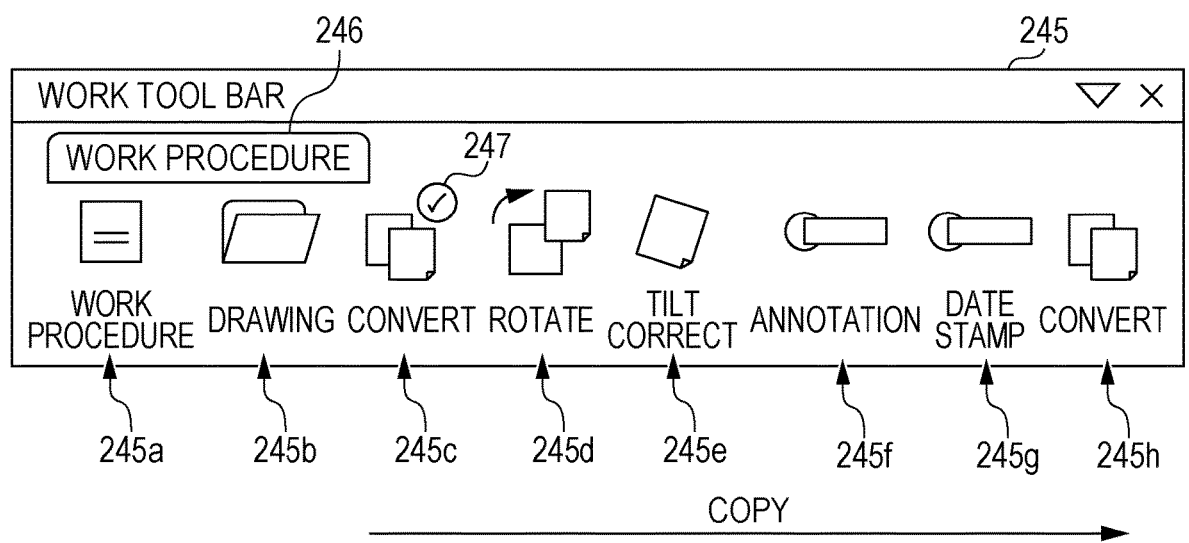
FIG. 10 illustrates an icon copying process according to the exemplary embodiment.

FIG. 10 illustrates a case where the convert icon 245c in the work tool bar 245 is copied. The user may copy the convert icon 245c and move a convert icon 245h to a copy destination located to the right of the date stamp icon 245g. In this case, the mark display unit 282 displays a check mark 247 in association with the convert icon 245c serving as a copy source, but does not display a check mark 247 in association with the convert icon 245h serving as a copy destination. This is because a check mark 247 is added only to the last-pressed icon.

Although the exemplary embodiment of the present invention has been described above, the exemplary embodiment of the present invention is not limited to the above exemplary embodiment, and various modifications are possible. The following description relates to modifications.

First Modification

In the exemplary embodiment, a check mark 247 is added to an icon displayed in the work tool bar 245 when the user presses the icon. Alternatively, in a case where a function or a command corresponding to an icon displayed in the work tool bar 245 is reflected the operation menu 242 and is selectable also from the operation menu 242, a check mark 247 may be added to the icon when a selection is made from the operation menu 242. In this case, an operation performed on the operation menu 242 substantially corresponds to an operation for pressing an icon.

Second Modification

In the exemplary embodiment, a check mark 247 is added to an icon last pressed by the user. Alternatively, the last-pressed icon may be changed in color, may be highlighted, may be given a frame, or may be changed in shape. In other words, the mark display unit 282 may display the last-pressed icon in a distinguishable mode from other icons in accordance with a command from the operation controller 26.

Third Modification

In the exemplary embodiment, a deleting operation, a name changing operation, and an icon changing operation are described as operations performed on an icon in the work tool bar 245. In the case of the deleting operation, the check mark 247 may also be simultaneously deleted. In the case of the name changing operation and the icon changing operation, the check mark 247 may be continuously displayed.

Fourth Modification

In the exemplary embodiment, when the name changing operation is performed on the tab 246 of the work tool bar 245 or when data is exported to another apparatus, the check mark 247 may be continuously displayed. However, in the case of the exporting process, information about the last-pressed icon may be deleted from the other apparatus that is to receive the data, before the data is exported thereto. This is because, when the other apparatus is to import the data, the configuration of the registry retaining information about the work tool bar 245 may change.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a processor programmed to:
        display a document and a list of a plurality of graphic symbols, the plurality of graphic symbols respectively indicating a plurality of jobs to perform to the document, the plurality of graphic symbols sequentially arranged in a predetermined direction, in accordance with a predetermined work procedure of the plurality of jobs;
        display any one of the plurality of graphic symbols, in a case where the graphic symbol is selected, in a distinguishable mode from another non-selected graphic symbol; and
        choose between operating in a first mode where, of selected graphic symbols, the processor displays only a last-selected graphic symbol in the distinguishable mode, and a second mode where, of selected graphic symbols, the processor displays all selected symbols in the distinguishable mode,
    wherein the plurality of graphic symbols are configured to be movable along the predetermined direction so as to allow for an order of the arranged symbols to be changed.

2. The information processing apparatus according to claim 1,
    wherein the processor is programmed to display the selected graphic symbol in the distinguishable mode by adding a mark in association with the selected graphic symbol.

3. The information processing apparatus according to claim 1,
    wherein the processor is programmed to display the selected graphic symbol in the distinguishable mode by highlighting the selected graphic symbol.

4. The information processing apparatus according to claim 1,
    wherein the processor is programmed to display the selected graphic symbol in the distinguishable mode by changing at least one of a color and a shape of the selected graphic symbol.

5. The information processing apparatus according to claim 1,
    wherein, in a case where the processor displays the selected graphic symbol in the distinguishable mode from the non-selected graphic symbol and subsequently displays the selected graphic symbol in a specific color to indicate that the selected graphic symbol is not eligible as an operable target, the processor continues to display the selected graphic symbol in the distinguishable mode.

6. The information processing apparatus according to claim 1,
    wherein, in a case where the processor displays the selected graphic symbol in the distinguishable mode from the non-selected graphic symbol and the selected graphic symbol is subsequently moved in accordance with an operation performed by a user, the processor continues to display the selected graphic symbol in the distinguishable mode.

7. The information processing apparatus according to claim 1,
    wherein, in a case where the processor displays the selected graphic symbol in the distinguishable mode from the non-selected graphic symbol and the selected graphic symbol is subsequently copied in accordance with an operation performed by a user, the processor continues to display the selected graphic symbol serving as a copy source in the distinguishable mode.

8. The information processing apparatus according to claim 1,
    wherein the display displays the plurality of graphic symbols for each of a plurality of documents, and
    wherein, in a case where any one of the plurality of graphic symbols is selected for each of the plurality of documents, the processor is programmed to display the selected graphic symbol in the distinguishable mode from a non-selected graphic symbol.

9. The information processing apparatus according to claim 8,
    wherein, in a case where the selected graphic symbol in any one of the plurality of documents is displayed in the distinguishable mode from the non-selected graphic symbol and is subsequently displayed in an original mode in accordance with an operation performed by a user, the processor is programmed to continue to display the selected graphic symbol in the distinguishable mode from the non-selected graphic symbol in another document.

10. The information processing apparatus according to claim 1, wherein the selected graphic symbol remains displayed in the distinguishable mode even if the predetermined work procedure is interrupted.

11. The information processing apparatus according to claim 1, wherein the processor is programmed to check whether the predetermined work procedure is interrupted, and wherein the last-selected graphic symbol remains displayed in the distinguishable mode even when the predetermined work procedure is interrupted.

12. A non-transitory computer readable medium storing a program causing a computer to execute a process for processing information, the process comprising:

displaying a document and a list of a plurality of graphic symbols, the plurality of graphic symbols respectively indicating a plurality of jobs to perform to the document, the plurality of graphic symbols sequentially arranged in a predetermined direction, in accordance with a predetermined work procedure of the plurality of jobs;

displaying any one of the plurality of graphic symbols, in a case where the graphic symbol is selected, in a distinguishable mode from another non-selected graphic symbol; and choosing between operating in a first mode where, of selected graphic symbols, the displaying displays only a last-selected graphic symbol in the distinguishable mode, and a second mode where, of selected graphic symbols, the displaying displays all selected symbols in the distinguishable mode, wherein the plurality of graphic symbols are configured to be movable along the predetermined direction so as to allow for an order of the arranged symbols to be changed.

* * * * *